United States Patent [19]

Pajtas

[11] Patent Number: 4,945,962
[45] Date of Patent: Aug. 7, 1990

[54] HONEYCOMB NON-PNEUMATIC TIRE WITH A SINGLE WEB ON ONE SIDE

[75] Inventor: Scott R. Pajtas, Warren, Mich.

[73] Assignee: The Uniroyal Goodrich Tire Company, Akron, Ohio

[21] Appl. No.: 364,344

[22] Filed: Jun. 9, 1989

[51] Int. Cl.$^5$ .................................................. B60C 7/10
[52] U.S. Cl. ......................................... 152/7; 152/11
[58] Field of Search .................. 301/63 PW; 152/1, 5, 152/7, 11, 12, 323–328

[56] References Cited

U.S. PATENT DOCUMENTS

| | | | |
|---|---|---|---|
| 1,258,573 | 3/1918 | Johnstone | 152/7 |
| 2,298,142 | 10/1942 | Martin | 152/7 |
| 4,832,098 | 5/1989 | Palinkas et al. | 152/7 |

FOREIGN PATENT DOCUMENTS 1278131 10/1960 France ..................................... 152/7

*Primary Examiner*—Russell D. Stormer
*Attorney, Agent, or Firm*—Alan A. Csontos; Alfred D. Lobo

[57] ABSTRACT

A side web non-pneumatic tire ("SWNPT") is integrally molded from a stiff, resilient elastomeric material with particular specifications, to form a unitary honeycomb structure bounded by integrally molded outer and inner cylindrical coaxial and coextensive members ("hoops"), and, a single side web member. The outer hoop is supported and cushioned by the honeycomb which comprises a plurality of circumferentially spaced apart, angularly oppositely directed planar rib members (ribs) bounded by the side web on one side only. The side web, preferably on the outboard edge of the hoops, connects the hoops near their outboard edges. The opposite side surfaces of the side web lie at an angle $\theta$ in the range from 0° to 30° on either side of vertical to the rotational axis of the SWNPT. The ribs extend axially along the inner and outer hoops, connecting them, and the outboard edges of all the ribs lie upon the inboard face of the web. The ribs on each side are angled at opposite angles in the range from 15° to 75° to radial planes which intersect them at their radially inner ends. A rubber tread is secured to the outer surface of the structural elements of the SWNPT provide a load-supporting outer hoop. The coaction of the structure which, in operation, is subjected to continuous compression and tensile forces as it travels over the ground. Deformation and buckling characteristics of the SWNPT are derived from the honeycomb structure of an elastomer which provides the SWNPT with "ride" and "handling" comparable to those of a conventional pneumatic tire. The outer hoop has a vulcanized rubber tread secured to the hoop's outer surface to withstand travel over a road surface. The unribbed face of the single side web may be faced with an elastomeric sidewall to resemble the sidewall of a conventional pneumatic tire.

21 Claims, 4 Drawing Sheets

HONEYCOMB NON-PNEUMATIC TIRE WITH A SINGLE WEB ON ONE SIDE

BACKGROUND OF THE INVENTION

This invention relates to a load-bearing side web non-pneumatic tire ("SWNPT" for brevity) having a generally quadrilateral silhouette (or toroidal, if the side web is capped to mimic the sidewall of a pneumatic tire, and the ribs are extended appropriately), viewed in cross-section in a vertical plane through the tire's (and wheel's) rotational spin axis. In one embodiment the cross-section is a generally rectangular silhouette, in another embodiment, one or both sides of the silhouette are either angulated or arcuate, and in yet another, a hybrid of the preceding rectangular and angulated or arcuate silhouettes. The tire comprises angularly oriented, oppositely directed planar rib members (referred to as "crossed ribs") integrally connected by a single planar web member on one side of the tire ("side web" for brevity) which results in a non-expansible annular honey-comb sandwiched between inner and outer hoop members ("hoops") so that there is at least one row of passages having a cross-section generally resembling a quadrilateral. This and other rows of passages which may have the same, or different, cross-sectional shapes are formed as in a honeycomb, by the crossed ribs. All passages are open at the passages' open ends away from the side web (hence referred to as "one-side-open" honeycomb construction). By "non-expansible" we refer to the diameter of a wheel fitted with a NPT, which diameter does not get larger when the wheel is rotated, due to the centrifugal forces generated during operation.

The SWNPT of this invention is configured from an elastomeric synthetic resinous material having specified desirable properties, so as to provide optimum handling, cornering and load bearing characteristics for a given mass of resinous material. The term "handling" is used to define the general responsiveness of the vehicle to the expectations of the driver, but more specifically refers to the dynamics of the tires on the wheels of the vehicle, and in turn, the vehicle itself, due to lateral acceleration. By "elastomeric synthetic resinous material" or "elastomer" we refer to a stiff, resilient, material having specific characteristics defined hereinafter. The elastomer may contain a minor proportion of a homopolymer or copolymer of a conjugated diene, preferably less than 10% by weight, and more preferably none. Rubber, whether natural or synthetic (particularly, styrene-butadiene rubber, SBR), and blends thereof containing a major proportion by weight of a homopolymer or copolymer of a conjugated diene, whether vulcanized or not, is not an elastomer as defined herein, as it fails to meet the criteria set forth herebelow.

In particular, the SWNPT provides handling and cornering comparable to that provided by the rectangular nonpneumatic tire ("RNPT") with a central web, disclosed in U.S. Pat. Nos. 4,784,201 and 4,832,098. Either nonpneumatic tire "NPT" (as used herein the acronym NPT refers to either a RNPT or a SWNPT, or both) allows itself to be deformed due to compression, and reverts to its original cylindrical shape while carrying its share of a load, typically as a tire mounted on a wheel rim of an automobile or a motorcycle. The dynamics of such deformation under load determines whether handling is satisfactory or not, such judgment generally being made with respect to a conventional pneumatic tire. Of course, a pneumatic tire has sidewalls which are smoothly and continuously blended into both side edges of its tread.

When a pneumatic tire is severely deflected laterally in the inboard direction, the portion of the sidewall nearest the outboard edge of the tread may come into contact with the road. By "inboard direction" we refer to the direction in which the vehicle is being turned. With greater deflection, as in a tighter turn at higher speed, progressively more of the sidewall contacts the road. Under the severest conditions, the identifying lettering on the sidewall may be scuffed away by abrasion with the road surface. The side web, positioned on the outboard edge, counters such lateral deflection in the SWNPT.

A RNPT, specifically, exhibits marginally satisfactory handling when the RNPT is used under conditions which generate a high lateral acceleration. Under such dynamic conditions, the annular portion of the RNPT in contact with the road, is deflected laterally without benefit of any restraint by its sidewalls, because the RNPT doesn't have any. It will be recognized that the tread of a NPT comes to an abrupt end at each of its shoulders. Under severe cornering conditions, the outboard edges of the tread of the RNPT are severely abraded.

The unique coaction of the structural elements of the SWNPT, distributes forces, particularly those generated during turns, so that the forces are redirected by the presence of its outboard side web. Such redistribution of the forces unexpectedly provides the SWNPT with essentially the same or better deformation and load-bearing characteristics than those of a RNPT having the same mass. Though the ride provided by each belies the stiffness of the elastomeric material and the total lack of air trapped within, the outboard side web provides a unique handling advantage over a pneumatic tire on a passenger automobile, yet with substantially no noticeable loss of the high degree of comfort provided by the pneumatic tire. The outboard sidewall of a pneumatic tire does not provide the same distribution or degree of stiffness provided by the side web.

The unique one-side-open construction of the SWNPT effectively dissipates heat generated during continuous cycling between alternating compressive and tensile forces in play during operation. Like the RNPT, the SWNPT is ideal for a wide spectrum of wheeled vehicles in which (i) the susceptibility to puncture is obviated, (ii) increased wheel diameter is desirable, and (iii) progressive failure of the SWPT is required. This last condition applies to special-purpose vehicles such as a personnel carrier subject to sudden and serious damage, as for example a bullet, so that the effect of such damage is thus minimized.

The overriding advantage of a pneumatic tire is the cushioning it provides, which cushioning, to date, as far as we know, has not been effectively mimiced with other NPTs. The disadvantage of the pneumatic tire is its susceptibility to being punctured. We know of no construction for an elastomeric NPT, other than the RNPT disclosed in the aforementioned commonly assigned patents, or of any prior art SWNPT which is reliable and rugged enough to withstand the rigors of normal operation when mounted on the wheel of an automobile.

As will readily be realized, NPTs have been routinely used on vehicles where neither handling, nor cushioning the load is a prime consideration, as for example in fork lift trucks, carts, wheelbarrows, tricycyles, and the like. Even so, the use of NPTs in such applications was less than satisfactory because prior art NPTs had undesirable handling characteristics. In addition, one could not provide a variable spring rate in a prior art NPT without changing either its design, that is, its structural configuration, or the materials of its construction. Apart from the lack of "good ride quality", solid tires, in particular those made from vulcanized rubber, were subject to high heat buildup and subsequent degradation after only constricted usage over a severely limited period. No prior art NPT that we know of suggests an integral NPT with a single side web and crossed ribs which are able to deform locally, that is, near the point where the NPT contacts the surface on which it is run, yet discharges its load-bearing and cushioning functions in a manner analogous to that in which a pneumatic tire discharges such functions.

In European patent application No. 0159888 A2, published Oct. 30, 1985, one embodiment (FIG. 9) of a honeycomb structure is provided, but with dual planar side webs which enclose planar ribs adhesively secured so as to cross each other in the central circumferential plane, therefore not forming a honeycomb structure (requiring intersection of the ribs along the entire length of each rib) sandwiched between two sidewalls. Moreover, though the dual sidewalls provide desired support and rigidity, the structure is a pneumatic tire which cannot be cooled because air is enclosed in an air-tight annulus. The open construction of our SWNPT not only serves to cool it during operation, but permits superior handling in the corners.

The concept of providing a web in a solid rubber tire is old, having been taught in German Offenlegungsschrift No. 24 60 051. For additional strength, the upper and lower flanges of the I-beam-like member are connected with interdigitated sinusoidal scallops along its inner surface. This manner of strengthening the structure is different from the oppositely directed ribs on either side of the web of the NPT. This reference, and all prior art references failed to recognize the peculiar function of planar oppositely directed angulated ribs which are undercut to help ensure that bending is negated, so that, instead of bending, buckling occurs when the critical load is exceeded. It is this peculiar characteristic of compressive deformation of the SWNPT in normal use, coupled with buckling of the ribs when the critical load is exceeded, which is instrumental in giving the SWNPT 'ride' characteristics which mimic those of a pneumatic tire, and excellent handling characteristics.

SUMMARY OF THE INVENTION

It has been discovered that a cross-section of a NPT having a single side web ("SWNPT") may be formed having a configuration of oppositely directed crossed ribs connected to a single circumferential side web member ("side web"), on only one side of the NPT. The side web, at its inner and outer radii, has its inner and outer peripheries respectively, connecting inner cylindrical ("inner hoop"), and outer cylindrical ("outer hoop") members respectively of the SWNPT, at only one of the edges of the hoops, the connected edges being directly one above the other.

It is therefore a general object of this invention to provide a SWNPT having a unique arrangement of oppositely directed ribs which extend axially from only one side, preferably the inboard side, of a continuous side web connecting the outboard edges of inner and outer coaxial hoops. The outboard and inboard sides of the web are at an angle $\theta$ in the range from about 1° to about 40°, flaring from the vertical on either side of the vertical to the rotational spin axis, and may be perpendicular ($\theta=0$) to the circumferential upper and lower surfaces of the hoops. Such an arrangement results in a SWNPT having the aforementioned characteristics, yet is capable of carrying a load of at least 226 kg (500 lbs), when mounted on the wheel of a vehicle operating at speeds up to 128 km/hr (80 miles/hr) for thousands of miles, without being much the worse for wear.

It is a specific object of this invention to provide a SWNPT with a "one-side-open" or non-compartmentalized honeycomb structure having a quadrilateral cross-section the sides of which cross-section are preferably inclined at an angle $\theta$ in the range from about 10° to about 30° from the vertical; which SWNPT is incapable of trapping air (which air normally provides a cushioning function in a pneumatic tire), and through which structure air circulates freely while the SWNPT is in operation, to keep the structure cool; and, which SWNPT provides essentially the same 'ride' and load-carrying ability as a RNPT of equal mass, but substantially better handling and/or a lower level of road noise under identical conditions of operation of a vehicle on which a wheel with the SWNPT is mounted.

BRIEF DESCRIPTION OF THE DRAWINGS

The foregoing and other objects and advantages of my invention will appear more fully from the following description, made in connection with the accompanying drawings of preferred embodiments of the inventions, wherein like characters refer to the same or similar parts throughout the views, and in which.

DETAILED DESCRIPTION OF PREFERRED EMBODIMENTS

Figure 1:
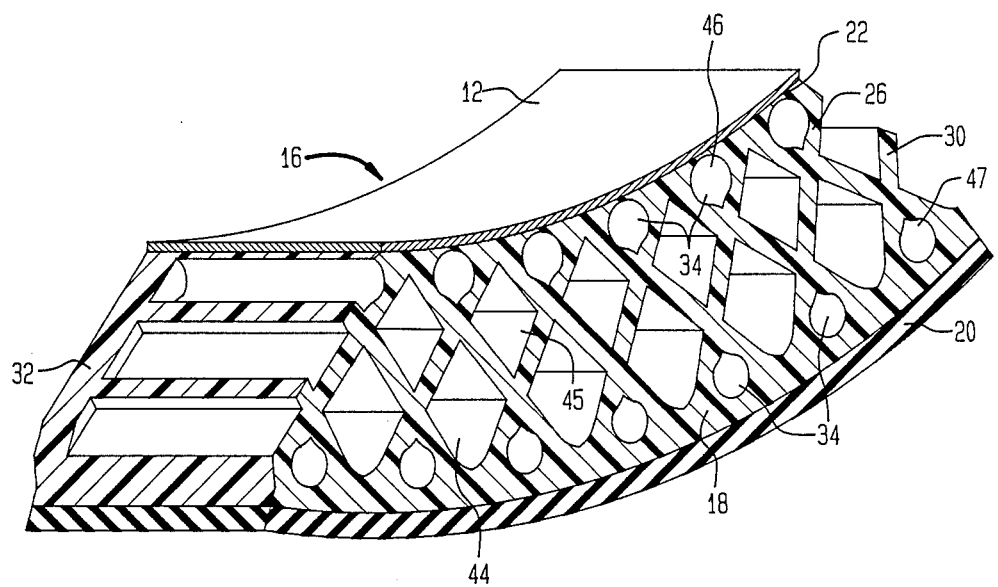
FIG. 1 is a fragmentary perspective view (viewed from the inboard side of a wheel mounted on an automobile) of the SWNPT, mounted on the rim of a wheel, one end of which is sectioned in an angular plane to show ribs crossed by intersecting each other along their entire widths (lengths in the axial direction). The outer surface of the SWNPT is covered with a tread.

It will be evident that the structural details of the SWNPT are tied to its functional characteristics during operation, and these in turn are derived from the materials of choice. Though it may be theoretically possible to provide a corresponding structure which functions similarly in other than an elastomeric material, we know of no way of doing so. We have discovered that it is only in those elastomeric materials which meet the specified properties, that the defined structure will provide the intended function with acceptable results; among such elastomeric materials now known are polyurethanes such as commercially available Adiprene from Uniroyal Chemical Corp., a segmented copolyester such as Hytrel 5556 from DuPont, and a block copolymer of nylon such as Nyrim from Monsanto Chemical Co.

In the best mode of the invention, the elastomer from which the annular resilient body of the SWNPT is formed has the following specific characteristics: Shore D hardness from about 40 to 65 (ASTM-D224), more preferably from about 45 to 55; a compression modulus (at 0.5 shape factor and 10% compression) in the range from about 3000 psi to about 20,000 psi, more preferably from about 5000 psi to 15,000 psi, which must not vary ±20% over the temperature range from 20° C. to 70° C. (ASTM-D695); a compression set of less than 60% (ASTM-D395B); a hysterisis (tan$\delta$) of less than 0.25 measured at 70° C. with a Rheometrics machine (ASTM-D2236), more preferably from about 0.05 to 0.15; and flex fatigue of more than 10,000 cycles at a maximum strain of 20% under normal operating conditions ('Texus' flex test, ASTM-D3629-78)). Such materials are polyurethane, segmented copolyesters believed to be prepared by ester interchange of dimethyl terephthalate and isophthalate with polytetramethyleneether glycol and excess 1,4-butanediol, and block copolymers of nylon with rubber.

The outer hoop may typically be provided with a rubber tread on the hoop's outer surface. The inner hoop is coaxial but not necessarily coextensive with the outer hoop, that is, the width (or length, measured in the axial direction) of the inner hoop may be the same as, or less than, that of the outer hoop. The net result is that the silhouette in cross-sectional elevation, will be different depending upon the embodiment of SWNPT chosen. In all embodiments, the profile of the open ends of the ribs is of significance only in so far as the ribs together provide the necessary flow of air through their open ends, to keep the SWNPT cool, below its softening point, during operation, and, for the cosmetic appearance of the inboard profile, if such appearance is of importance. In each of the following embodiments illustrated, a center-line is drawn through the mid-point of the side web where it meets the inner hoop, to illustrate more clearly the shape of the side web as its thickness is varied. The shape and thickness of the side web are key elements in the determination of the handling characteristics to be built into the SWNPT. The terms "inboard" and "outboard" are used herein to indicate direction or positioning relative to the center-line of a wheeled vehicle on which the SWNPT is intended to be used. In an automobile, "outboard" refers to the outermost right and left hand sides (of a driver seated in driving position) of the automobile.

In the embodiment schematically illustrated in FIGS. 1-3, 4 and 7, the SWNPT (without the rubber cap and tread) is referred to as a "planar" SWNPT because a cross-sectional view of the side web shows it has parallel, vertical, inboard and outboard surfaces.

The SWNPT (without the rubber cap and tread) is referred to as being "rectangular" (as for example, the right hand SWNPT of the two shown in FIG. 8) when it presents a vertical inboard visual profile of a planar web, a vertical line (at the open ends of the ribs), and, first and second horizontal lines at the outer surfaces of the outer and inner hoops respectively, so that the general shape of the periphery of the cross-section of synthetic resinous material is a rectangle.

Figure 5:
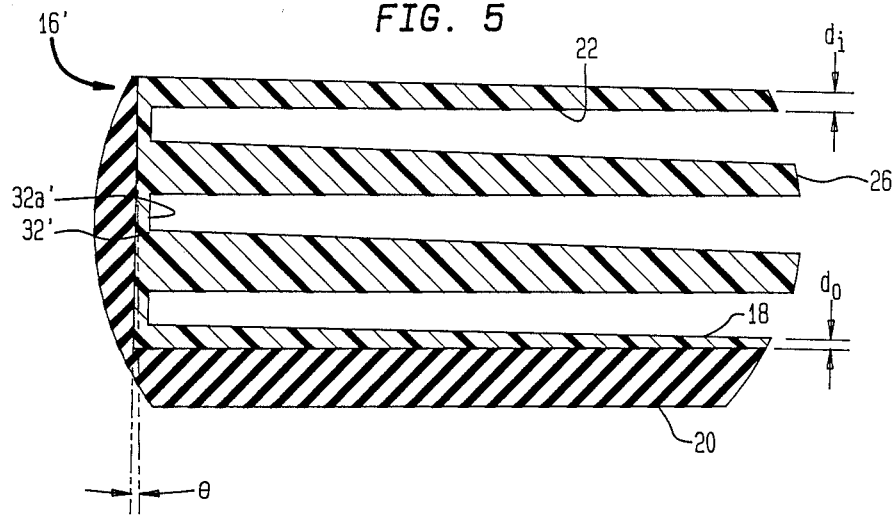
FIG. 5, is a partial side elevation sectional view taken in an angulated plane (analogous to that shown as line 3—3 in FIG. 2), showing the SWNPT in which both the outboard and inboard faces of the side web are "angled", flaring outwardly continuously, starting at the outboard edge of the inner hoop and joining the outboard edge of the outer hoop below.

In the embodiment schematically illustrated in FIG. 5, and referred to as an "angled" side web, the elevational visual profile of the ribs presents either an arcuate or vertical line at their open ends (an arcuate line is shown); outwardly inclined parallel lines at the inner and outer surfaces of the angled side web, these lines flaring outwardly at angle θ from the radial plane (relative to the rotational spin axis) at the outer surface of the inner hoop; so that the shape of the periphery of the cross-section is generally of a trapezoid (a quadrilateral having two parallel sides).

Figure 6:
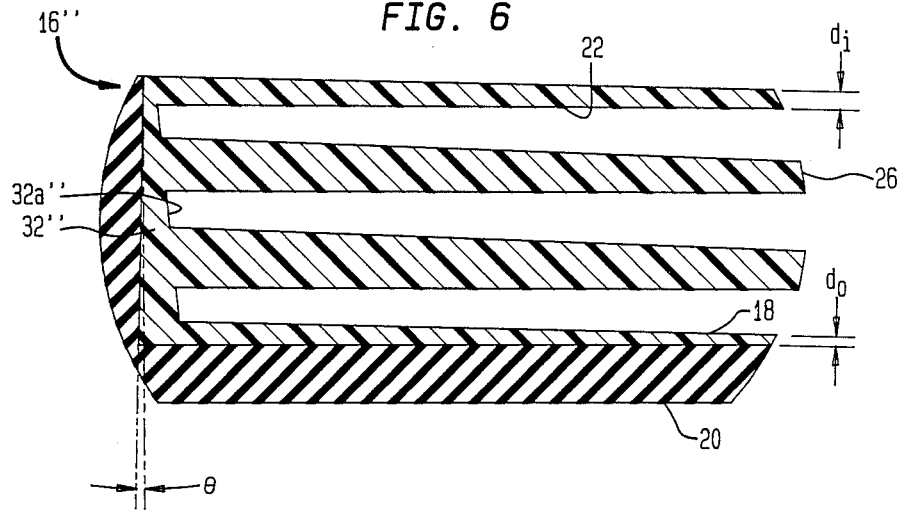
FIG. 6 is a sectional side elevation view taken in an angulated plane (as taken in FIGS. 3 and 5) of an embodiment of the SWNPT in which the side web is "wedge-shaped", the inboard face flaring inwardly (or inboardly), and the outboard face flaring outwardly (outboardly); the side web flares to the outboard edge of the inner hoop and the outboard edge of the outer hoop below.

In the embodiment schematically illustrated in FIG. 6, referred to as the "wedge-shaped" SWNPT because of the wedge-shape of its side web, the elevational profile of the ribs presents an arcuate line at their open ends; the inboard face of the wedge-shaped side web flares ±θ°, that is, inwardly at −θ° from the radially outer surface of the inner hoop to the radially inner surface of the outer hoop; and, outwardly at ±θ° from the radially inner surface of the inner hoop to the radially outer surface of the outer hoop, so that the shape of the periphery of the cross-section is a trapezoid.

It will now be evident that when the side web is covered with an arcuate rubber or other elastomeric sidewall cap, and the ribs are of progressively varying widths, the width of each rib being greatest at the circumferential centerline, the arcuate profile of the SWNPT's open side will be toroidal, approximating the cross-section of a conventional pneumatic tire.

The performance of any of the foregoing shapes of SWNPT is not adversely affected by the profile of the ribs at the SWNPT's open side. Such a profile may result with an open end which (a) flares outwardly at angle θ in an angulated plane, or, (b) is arcuate (convex), so as to present a cosmetically pleasing symmetry of side profiles, the arcuate curve matching the convex outline of a foraminous rubber cap used to simulate a sidewall of a conventional pneumatic tire, the cap being perforated to cool the SWNPT during operation.

The hoops are circular bands, much wider (that is, longer, in the axial direction) than they are thick (measured in the radial direction). The inner surface of the inner hoop is securely mounted on the rim of a wheel, so that the SWNPT, with a tread, may be used much the same way as a RNPT, or, a conventional pneumatic tire. Most preferably, the inner hoop is bonded to the rim, either by the adhesive strength of the polyurethane, or with an additional adhesive, so that mechanical fastening of the SWNPT to the rim is unnecessary.

Figure 2:
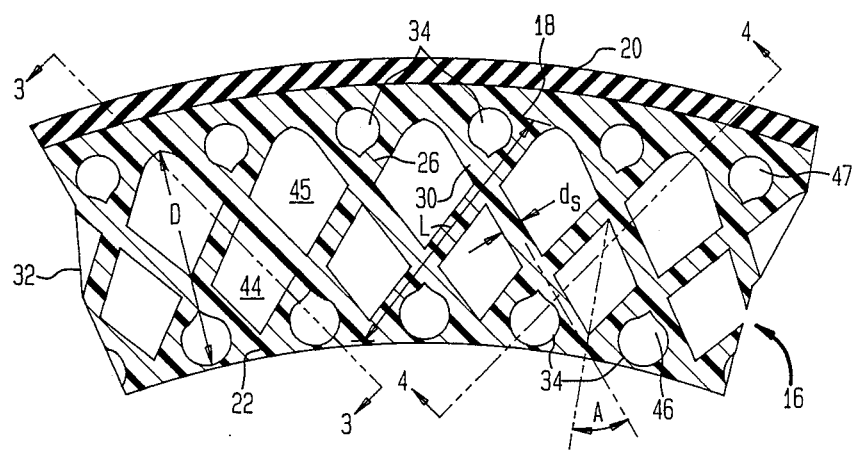
FIG. 2 is a fragmentary perspective view (viewed looking to the outboard side) of a side elevation view of a portion of the annular body of the SWNPT shown in FIG. 1, showing generally quadrilateral passages formed by oppositely directed, crossed planar ribs formed integrally with a single side web member (in the rear of this view) closing the passages; and inner and outer hoops, which in combination, coact to produce a one-side-open honeycomb construction which functions as the SWNPT.
Figure 3:
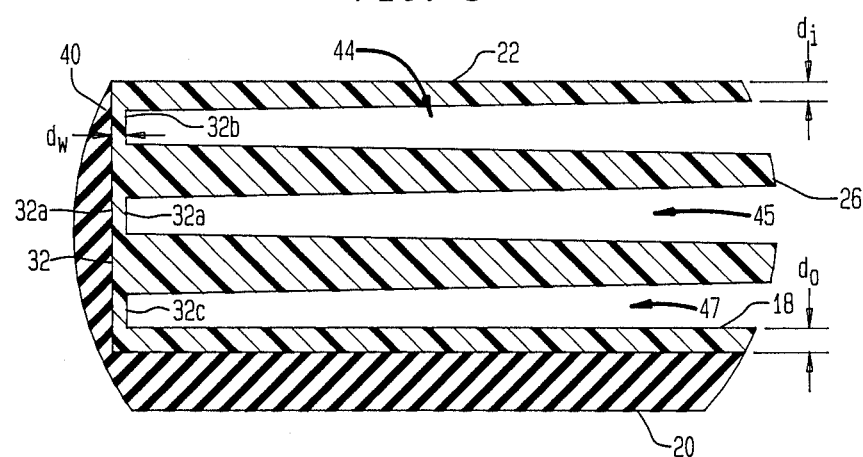
FIG. 3 is a fragmentary sectional side elevation view taken in an angulated plane along the line 3—3 of FIG. 2, showing a "planar" SWNPT, having both vertical surfaces (both sides) of the web substantially normal to both hoops. The web is capped with a rubber sidewall so as to present a toroidal cross-section mimicing that of a pneumatic tire; sectioned differently from the rubber, are the "planar" elastomeric side web and ribs; and viewed from the open side, appear axial passages of the honeycomb structure formed by the crossed ribs and side web, the first and second ribs being angulated in the same angular range, but oppositely directed. The outer hoop is covered with a rubber tread (the cap and tread are shown in the Figure as being continuous).

In the embodiment illustrated in FIGS. 1-3, the outer hoop 18 is spaced apart from the inner hoop 22 by a plurality of circumferentially spaced-apart oppositely directed and crossed planar first and second ribs, 26 and 30 respectively; and, a single side web 32, all of which are formed as a unitary construction. The single side web connects the inner and outer hoops at their outboard ends, that is, along the circumferential outer edges of the SWNPT, so that, if there were no ribs, the shape would be that of a U channel (lying on its one side) formed into a circle, the inner flange being substantially the same width, or narrower than the outer.

The ribs extend as first and second sets of ribs, on the inboard side of the single side web, the first set angled in the range from about 15° to 75° to the radial planes which intersect the ribs in one direction, the second set angled in the same range but in the opposite direction. Preferably, the ribs are oppositely directed at an angle in the range from about 30° to 60° so that they form a honeycomb structure with longitudinal passages open at one end, but closed on the other side by the single side web, so that passages 44 or 45 in at least one row of the honeycomb structure are longitudinal cells having a cross-section shaped substantially like a quadrilateral. Still other passages 46 and 47 near the inner and outer hoops respectively are more circular than quadrilateral.

The unitary structure of the SWNPT, indicated generally by reference numeral 16, is mounted on wheel rim 12 and configured so that the web and rib members provide a load-carrying structure with continuous deformation due to compression of the SWNPT as it rotates during operation. The thickness of the side web, the ribs and the hoops are such that there is essentially no detectable expansion of the SWNPT during operation; but in addition to deformation without buckling, due to compression during normal operation, the SWNPT is configured to allow the ribs to buckle, either individually or severally, when the SWNPT runs over a sudden projection in the road's surface. The word "buckle" as used herein is defined as a relatively sudden and radical deformation as a result of compression loading that exceeds a certain critical load value (hereinafter referred to as $P_{cr}$).

The ribs 26 and 30 of the first and second sets respectively are of equal length L (in the generally radial direction) and oppositely directed, but at the same angle, for convenience in the molding of the SWNPT. To form the honeycomb structure, first ribs 26 must cross second ribs 30, resulting in "crossed" ribs for optimum stiffness and load-carrying ability. Less convenient to mold is an SWNPT in which both, the lengths L (measured from the inner to the outer hoops) and the angulation of the ribs may be different as long as they are oppositely directed. The ribs 26 have a thickness $d_s$ measured in a direction perpendicular to its width (or length measured along the axis). The ribs are preferably undercut at 34, as shown, where their ends meet the inner and outer hoops 22 and 18 respectively, to enhance flexibility of the connection, thus facilitating compression of the ribs 26 and 30 without bending as each portion of the circumference of the SWNPT contacts the ground while the vehicle on which the SWNPT is mounted travels over the ground.

Referring now to FIG. 3, the planar side web 32 is positioned at the outboard axial ends of the inner and outer hoops 18 an 22, and connected at its (the web's) radially inner periphery 32b to the inner hoop 22, and at its radially outer periphery 32c to outer hoop 18, so that the edges of ribs 26 and 30 lie along the inboard face 32a of the planar side web 32. All the first ribs 26 are similarly connected, so that all ribs are angled at angle A (see FIG. 2) in the same direction, but the angle A may be different from one rib to another. In an analogous manner, all the second ribs 30 are connected at their corresponding inner and outer ends to the inner and outer hoops respectively and the ribs' edges also lie along the face 32a of the web, so that all the ribs in each of the sets 26 and 30 are angled at substantially equal angles A in the range from about 15° to about 75° to radial planes which intersect the ribs at their inner ends, but in opposite directions.

When the SWNPT is to be used as a tire for an automobile or truck, the SWNPT is provided with a rubber tread 20 secured to the outer circumferential surface of the outer hoop 18. The stiffening function of the web 32 in combination with the crossed ribs is more clearly evident in FIG. 1. The web tends to prevent the ribs from deforming by being bent along L, but allows compressive deformation of the SWNPT in the area around the point of contact with the ground. The ribs, in turn, prevent the web from buckling in the axial direction until $P_{cr}$ is reached, so that the web and crossed ribs cooperate to carry the load. Changing the angle A of the ribs, effectively varies the spring rate without changing the dimensions of the structural components of the SWNPT, or the composition of the elastomer from which it is molded.

The ability of the SWNPT to be deformed yet return to its cylindrical shape, essentially instantaneously, under compression and sudden transitions of loading, requires that the SWNPT withstand a maximum strain of 20% during normal operation over several thousand miles, yet buckle locally to absorb the sudden impact of a projecting object, or road surface irregularity. It is this unexpected ability derived from its unique construction from the elastomer which gives the SWNPT the handling and ride characteristics deemed essential in a conventional pneumatic tire.

The particular design of the essential deformability and buckling characteristics of the SWNPT which imbue it with the ability to mimic the ride and handling characteristics of a convention pneumatic tire, may be varied not only by changing the dimensions of the ribs and web, and the dimensions and relative disposition of the ribs, but also by varying the radius of the undercuts 34 which preferably range from 0.05" to 0.5" on the acute angle junctions of the ribs with the inner and outer hoops; and, from 0.25" to 1" on the obtuse angle junctions of the ribs with the inner and outer hoops. It is most preferred to undercut only one end of each rib only in the acute angles where that rib joins the inner hoop and outer hoops. To mimic the silhouette of a pneumatic tire the ribs are of unequal lengths, and the side web is capped with cap 40.

Figure 4:
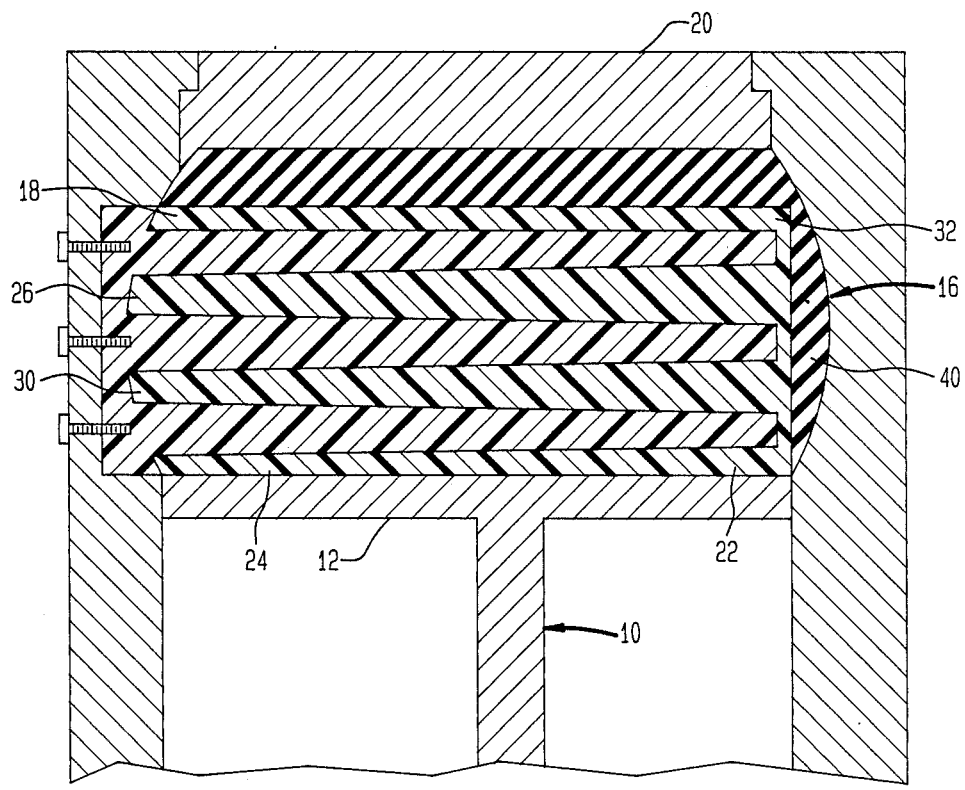
FIG. 4 is a sectional side elevation view taken in an angulated plane along the line 4—4 in FIG. 2, showing the SWNPT with a planar web in the mold. The side web is integral with first and second sets of ribs which cross and terminate at the inboard face of the side web lying in a radial plane, yet the ribs join the inner and outer hoops below and above, leaving open the side opposite the side web. This view, taken in an axial plane of the SWNPT and mold in which it is molded, shows the mating left mold with pins positioned to provide the passages of the honeycomb structure to be formed; and, the mating right mold against which a "planar" side web is molded. A rubber tread and rubber cap for the side web (to mimic a pneumatic tire) is pre-positioned in the mold.

Referring to FIG. 4 there is shown an elevational view of a mold, with portions broken away, of a wheel indicated generally by 10, including the SWNPT 16 of this invention, molded from polyurethane and mounted on wheel rim 12. In addition to the planar first ribs 26 (referred to as a first set) are the additional second ribs 30 which constitute a second set, so referred to because the first and second sets of ribs are integrally connected by the side web 32 having a thickness $d_w$, which web also connects the outer and inner hoops 18 and 22. The term "integral" refers to the SWNPT being formed as a whole, and the term "unitary" describes the interaction of the component structural elements as a unit. The terms together emphasize the molding or casting of the inner and outer hoops, the web and the ribs as a single construction using the elastomer, and the coaction of these structural elements of the SWNPT to discharge its stated functions. The hoop spacing is D.

For economy in manufacture, the tread 20 and cap 40 are produced as a continuous extrudate. A measured length of this extrudate is cut and pre-positioned in the mold before pouring the elastomer into it.

Referring to FIG. 5 there is schematically illustrated an angled SWNPT 16' similar to that shown in FIG. 3, having inner and outer hoops having thickness $d_i$ and $d_o$ respectively, first and second ribs 26 and 30 respectively, but an angled side web 32', both surfaces of which are flared outward to improve cornering. The inner face 32a' and the outer face are both angled at $\pm \theta°$ which ranges from 0°, when the side web is planar, to about 45°, the preferred range for an angled side web being in the range from about 1° to about 25°, depending of course upon the lateral forces the wheel is to endure, and the size of the wheel.

Referring to FIG. 6 there is schematically illustrated a wedge-shaped SWNPT 16" similar to that shown in FIG. 5, except that the side web 32" is wedge-shaped. The inner face 32a" is angled inward at $-\theta°$, and the outer face of the wedge-shaped side web is angled outward at $+\theta°$, so that the angle of the wedge is $2\theta°$, when the inner face 32" and outer face of the wedge flare at equal angles, and they may not be equal.

Figure 7:
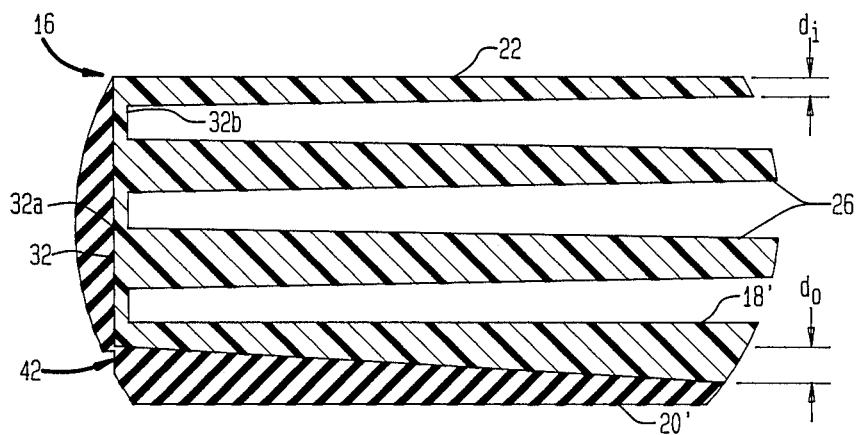
FIG. 7 is a sectional side elevation view taken in an angulated plane in a manner analogous to that shown in FIG. 6, showing the SWNPT with a "planar" side web, except that the outer hoop is tapered, being thicker at its inboard end than at its outboard end.

Referring to FIG. 7 there is schematically illustrated a planar SWNPT 16 similar to that shown in FIG. 3, except that it has a tapered outer hoop 18' to provide greater stiffness near its inboard end than is obtained with an outer hoop of substantially constant thickness. To provide a flat lower surface, the inner surface of tread 20' is tapered correspondingly. To facilitate cooling of the tread 20' it is provided with one or more (one is shown) shoulder grooves 42 which also make pre-positioning the combination extrudate of tread and cap in the mold easier.

Figure 9:
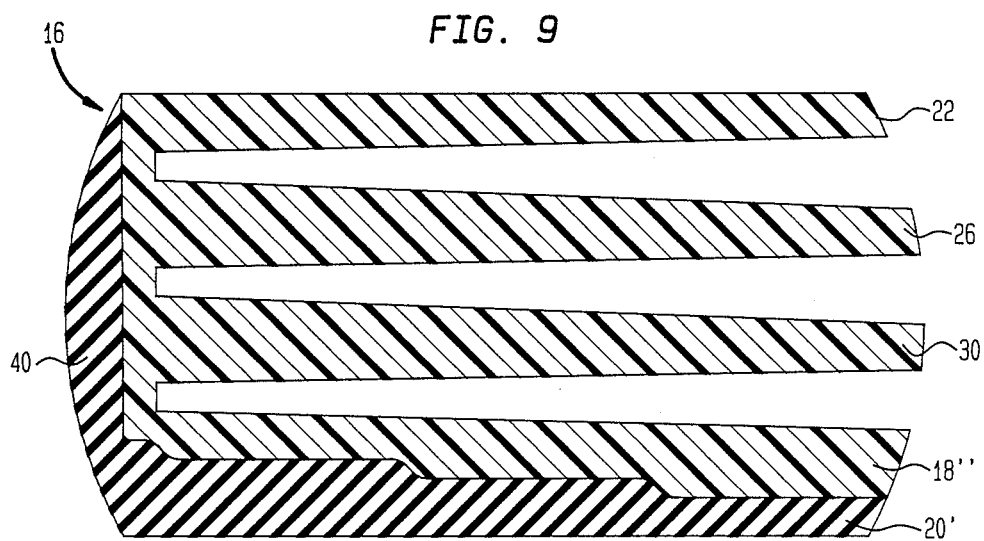
FIG. 9 is a sectional side elevation view taken in an angulated plane in a manner analogous to that shown in FIG. 7, showing the SWNPT with a "planar" side web, except that the outer hoop is stepped, having the thickest step at its inboard end.

Referring to FIG. 9 there is schematically illustrated a planar SWNPT 16 similar to that shown in FIG. 7, except that it has an outer hoop 18" which is stepped, rather than tapered, to provide greater stiffness near its inboard end than is obtained with an outer hoop of substantially constant thickness. To provide a flat lower surface, the inner surface of tread 20' is stepped correspondingly.

An annular body of a SWNPT for a luggage cart, fork lift, an automobile tire or spare tire, or insert for a pneumatic tire designed to have "run-flat" operation, is formed with dimensions, dimensional relationships, and angular relationships which fall within the preferred ranges set forth in the following Table.

TABLE 1

| Item | Preferred range |
| --- | --- |
| $r_o$ | 4" to 18" |
| A | 20° to 60° |
| $\theta$ | 0° to 25° |
| $d_i$, $d_o$ | 0.0312" to 0.5" |
| D | 1" to 5" |
| $r_o/D$ | 0.8/1 to 18/1 |
| $D/d_w$ | 100/1 to 4/1 |
| L | 1.06" to 10" |
| $L/d_s$ | 0.35/1 to 66.7/1 |
| $t_i$, $t_o$ | 1.5" to 10" |
| $r_i$ | 2" to 17" | wherein,

A is the rib angle; $\theta$ is the angle from vertical;

$r_i$ and $r_o$ are the radii of the inner and outer hoops respectively;

$d_1$ and $d_o$ are the thicknesses of the inner and outer hoops respectively;

D is the difference between $r_o$ and $r_i$;

$d_w$ is the web thickness; $d_s$ is the rib thickness;

L is the length (between hoops) of a rib; and, $t_i$, $t_o$ are the rim width and tread width, respectively.

Figure 8:
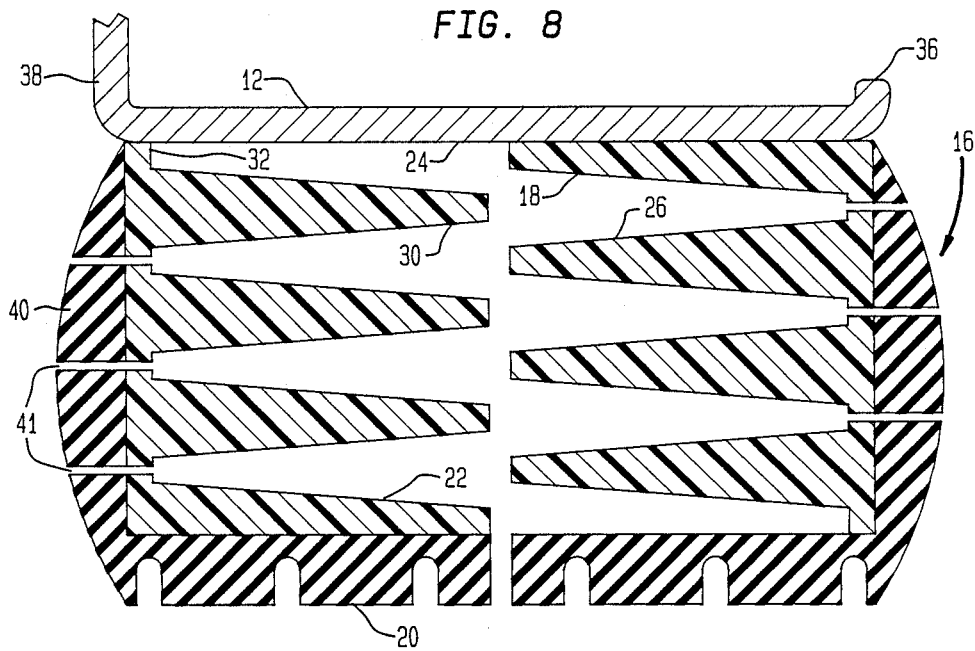
FIG. 8 is a sectional side elevation view taken in an angulated plane in a manner analogous to that shown in FIG. 3, showing a pair of identical SWNPTs mounted in spaced-apart mirror image relationship on a wheel rim, each SWNPT with a "planar" side web, to provide an inboard-mounted SWNPT in addition to an outboard-mounted one, so as to provide desirable tread width. The profiles of the open ends of the honeycombs are vertical. Grooves in the shoulders of the rubber covering each SWNPT, and vent passages in the rubber cap on the side web provide enhanced cooling during operation of a vehicle.

FIG. 8 schematically illustrates an angulated cross-sectional view of a pair of identical (twin) planar SWNPTs mounted in spaced apart mirror image relationship upon a wheel rim to provide a "wide footprint", yet permit the twin SWNPTs to generate a sufficient air-flow within the honeycomb structures to permit adequate cooling of the assembly. For cosmetic purposes, the outboard and inboard outer surfaces of each SWNPT is covered with a rubber cap and tread.

When the loading force on the SWNPT is approximately 800 lb (363 kg), it undergoes normal compressive deformation, in a manner analogous with that obtained with the NPT of the parent application, during operation of a vehicle over a smooth road surface. The ribs 26 and 30, which intersect each other over their entire lengths (when they cross), most directly support the major portion of the load, and are under sufficient compression to decrease the overall lengths of the ribs. In a typical instance, the unloaded ribs are each 2.12" (5.83 cm) long, while the loaded ribs are 1.99" (5.05 cm) long.

While the ribs 26 and 30 are compressed in the groundcontact area during operation, the side web 32 connecting the ribs in this area is subjected to both compression and shear forces, and might even be subjected to tensile forces. The web 32 and ribs 26 and 30 thus interact to distribute the loading forces.

The SWNPT will most closely approximate the ride characteristics of a pneumatic tire if the ribs are constructed to reach $P_{cr}$ when the load exceeds the total load which then causes the NPT to undergo a deflection which is between 6% and 25% of tire section height ($SH = r_0 - r_i$). This means that when the tire undergoes a load that causes D to compress beyond 6% of the original D, then the tire reaches $P_{cr}$ and buckles. This may be expressed as follows:

$$0.06 < \frac{P_{cr}/K}{SH} < 0.25$$

wherein
0.06 = 6% deflection
0.25 = 25% deflection
$P_{cr}$ = critical buckling load
K = spring rate of NPT, and
SH = section height.

The space and weight objectives for a SWPNT which replaces a pnematic tire are best met if the total material volume (space occupied by the material of the SWNPT) divided by total projected volume (space between the outer surface of the outer hoop and the inner surface of the inner hoop) is between 20% and 60%.

Another desirable characteristic of any tire is an overall spring rate which changes depending upon the type of surface against which the tire is loaded. Specifically, it is desirable that the spring rate be lower over a bump or obstructing article in the path of the SWNPT, than over a flat surface. In the SWNPT the desirable ratio of spring rate over a flat surface divided by spring rate over a 0.5" (1.27 cm) wide (high) cleat is between 1.4 and 6.0, preferably between 3 and 4.

The annular body 16 may be adhered to the surface 24 of wheel rim 12 by being molded directly thereto in a conventional liquid molding process, with the outer surface 24 having been prepared in a known manner to receive and secure the elastomer used. Preferably the wheel rim 12 is provided with flanges 36 and 38 which cooperate with the mold to form the annular body 16 on surface 24. Any conventional method for molding polyurethane may be used to form the SWNPT, such as one described in aforementioned U.S. Pat. No. 4,832,098. The molding may conveniently be done with mold halves configured as shown in FIG. 4 for a planar side web, and modified to provide "angled" and "wedge-shaped" SWNPTs respectively, it being evident that the positioning of the pins will be critical to provide the desired honeycomb structure. Equally evident is that the mold is to be filled with a fluent elastomer without producing pockets of air (voids) within the SWNPT. If desired, the cap 40 may be provided with vent passages 41 to facilitate cooling, and grooves in the tread for improved traction while the SWNPT while it is in operation.

The following illustrative example 1 provides details of a molded polyurethane NPT.

EXAMPLE 1

Molding the annular body of the SWNPT, then adhesively securing it to a wheel rim, and adhesively securing a tread to the outer surface of the SWNPT:

A SWNPT is conventionally molded in a mold having an inner mold ring by filling the mold with a reaction mixture of (a) toluenediisocyanate-poly(tetramethyleneether glycol (M.W. range 1000–2000, preferably about 1000) (TDI-PTMEG) prepolymer having a NCO number of 6.5, and, (b) methylene-bis-orthochloroaniline (MBOCA) curative the (a/b) weight ratio being 1/0.21. Prior to mixing the foregoing components, the TDI-PTMEG is heated to 70° C. and the MBOCA is heated to 120° C. The mold is also heated to 100° C. prior to introducing the reaction mixture.

The liquid reaction mixture is poured into the mold with care being taken to ensure that all the air in the mold is displaced by the liquid.

Once the mold is filled it is placed for about 15 min in an oven (set for 110° C.) to cure the polyurethane. Subsequently, the mold is opened and the annular body removed and post-cured for about 16 hr at 110° C. The SWNPT formed has ribs which are undercut in the acute angle at the inner hoop, and in the corresponding obtuse angle on the other side of the rib where it meets the outer hoop.

A rubber tire tread having a thickness of about 0.7 inch is then adhered to the outer surface of the outer hoop 18 using a commercially available adhesive containing an aromatic diisocyanate and the resulting tire is fitted and adhered to a steel rim 12 using a polyurethane adhesive cured with an organic isocyanate curative. A more economic alternative, is to pre-position the rubber tread in the mold as mentioned hereinabove may be done with a continuous extrudate of a unitary tread-and-cap insert, before pouring the polyurethane into the mold.

The SWNPT has the following dimensions:

| | |
|---|---|
| $r_i$ | 10" (25.4 cm) |
| $r_o$ | 12" (30.48 cm) |
| A | 45° and 135° |
| $d_i$, $d_o$ | 0.05" (0.13 cm), and 0.14" (0.356 cm) |
| D | 1.25" (3.18 cm) |
| $r_o/D$ | 9.6 |
| $D/d_w$ | 12.5 |
| L | 1.77" (4.49 cm) |
| $L/d_s$ | 8.85 |
| $t_i$ and $t_o$ | 6.68" (16.96 cm), each |

From the foregoing detailed description it will now be evident that the structure of the SWNPT of my invention is unique in that its honeycomb structure provides it stiffness but is deliberately designed to buckle under specified conditions to provide the characteristics essential to mimic a conventional pneumatic tire. This unique construction demands that the ribs be angulated and they be compressible, rather than bend under load. The resulting "open" structure, closed at one end by the side web, not only provides the essential ride and handling characteristics but allows the SWNPT to dissipate heat during operation. The foregoing characteristics are lacking in any logical combination of the teachings of prior art references, each of which is conceptually so different that combining their teachings simply magnifies not only their conceptual differences but also the interaction of the structural elements which produce them.

Having thus provided a general discussion of the problem addressed and solved in our invention, specific illustrations of the best mode of my SWNPT, it is to be understood that no undue restrictions are to be imposed by reason thereof except as provided by the following claims.

I claim:

1. A non-pneumatic tire rotatable about an axis, said tire comprising an annular body of a resilient elastomeric synthetic resinous material, said body consisting essentially of a generally cylindrical outer member at the outer periphery of said body, a generally cylindrical inner member spaced radially inward from and coaxial with said outer member, a plurality of axially extending, circumferentially spaced-apart first and second rib members connected at their corresponding inner and outer ends to said inner and outer cylindrical members, said rib members being oppositely directed at angles of from about 15° to 75° to radial planes which intersect them at their inner ends, and a unitary circumferential side web member having opposite side faces at an angle $\theta$ in the range from 0° to 30° on either side of the vertical to the rotational axis of the tire, said side web member having its radially inner and outer peripheries connected respectively to said inner and outer cylindrical members only at one edge of each, one connected edge above the other, said side web member being connected on only one side face to both said first and second rib members, said first rib members being directed oppositely to said second rib members with respect to said radial planes, to form with said inner and outer cylindrical members and said web member, a loadcarrying honeycomb structure which provides locally loaded members adapted to buckle.

2. The tire of claim 1 wherein said angle $\theta = 0°$ so that said side web member is perpendicular to the rotational spin axis of the tire, and is positioned at the outboard edge of the axial ends of said cylindrical members, and wherein each of said rib members extends axially from the inboard side face of said side web member.

3. The tire of claim 1 wherein said first and second rib members are undercut at each end of each rib at least in the acute angle where said each rib joins said inner and outer cylindrical members.

4. The tire of claim 1 wherein said side web flares outwardly from said inner cylindrical member at said angle $\theta$ so that said side web member is inclined away from the rotational spin axis of the tire, and is positioned at the outboard edge of the axial ends of said cylindrical members, so as to provide an angled side web member, and wherein each of said rib members extends axially from the inboard side face of said side web member.

5. The tire of claim 1 wherein said side web flares both inwardly and outwardly from said inner cylindrical member at said angle $\theta$ so that said side web member is wedge-shaped, and is positioned at the outboard edge of the axial ends of said cylindrical members, and wherein each of said rib members extends axially from the inboard side face of said side web member.

6. The tire of claim 1 wherein said rib angles are substantially equal in the range from 20° to 60°.

7. The tire of claim 3 wherein all said ribs are of equal width (length in the axial direction) so that the inboard ends of said ribs terminate in a vertical plane to produce a rectangular silhouette of said non-pneumatic tire.

8. The tire of claim 3 wherein said ribs are of unequal length in the axial direction so that the inboard ends of said ribs terminate with an arcuate profile.

9. The tire of claim 4 wherein said ribs are of unequal length in the axial direction so that the inboard ends of said ribs terminate in an inclined plane at substantially the same angle as said angled side web member.

10. The tire of claim 3 wherein said outer cylindrical member has secured to its outer surface, a circumferential tread; and, said inner cylindrical member has secured to its inner circumferential surface, a wheel rim.

11. The tire of claim 10 wherein the outer surface of said side web member is covered with a generally convex rubber or other elastomeric cap member.

12. The tire of claim 6 wherein said outer cylindrical member has secured to its outer surface, a circumferential tread integral with a generally convex cap member which covers the outer surface of said side web member.

13. The tire of claim 12 wherein said circumferential tread has at least one circumferential groove cut in the shoulder region between said and said convex cap member so that said groove facilitates cooling of the tread, cap and synthetic resinous material.

14. The tire of claim 12 wherein said convex cap member is perforated with passages terminating at said side web so as to facilitate cooling of said tire.

15. The tire of claim 10 wherein the outboard surface of said side web member is in the vertical plane at right angle to the rotational spin axis of said tire.

16. The tire of claim 10 wherein the outboard surface of said side web member flares outwardly at an angle $\theta$ in the range from 1° to about 20° from the vertical, and inboard ends of said ribs flare outwardly producing passages with open ends, said ribs terminating to produce a convex silhouette.

17. The tire of claim ,3 wherein said synthetic resinous material contains a minor proportion by weight of a homopolymer or copolymer of a conjugated diene, and has the following specific characteristics: Shore D hardness in the range from about 40 to 65 (ASTM-D224); a compression modulus (at 0.5 shape factor and 10% compression) in the range from about 3000 psi to about 20,000 psi, said modulus being maintained ±20% over the temperature range from 20° C. to 70° C. (ASTM-D695); a compression set of less than 60% (ASTM-D395B); a hysterisis (tan$\delta$) measured at 70° C. with a Rheometrics machine (ASTM-D2236), in the range from about 0.05 to 0.15; and a flex fatigue of more than 10,000 cycles at a maximum strain of 20° under normal operating conditions ('Texus' flex test, ASTM-D3629-78)).

18. The tire of claim 10 wherein said tread, said annular body, and said wheel rim form an integral wheel structure.

19. The tire of claim 17 wherein said elastomer is polyurethane.

20. The tire of claim 19 wherein said polyurethane is derived from a reaction mixture of
   (a) toluenediisocyanate-poly(tetramethyleneether glycol (M.W. 1000 to about 2000) (TDI-PTMEG) prepolymer having from about 5% to about 7% NCO, and,
   (b) a curative in an amount sufficient to provide the desired cure of said prepolymer.

21. The tire of claim 20 wherein said curative is selected from the group consisting of methylenedianiline-NaCl complex (MDA-NaCl, 50% by weight in dioctylphthalate), and, methylene-bis-orthochloroaniline (MBOCA), the (a/b) weight ratio being in the range from 1/0.05 to about 1/0.3.

* * * * *

UNITED STATES PATENT AND TRADEMARK OFFICE
CERTIFICATE OF CORRECTION

PATENT NO. : 4,945,962

DATED : August 7, 1990

INVENTOR(S) : Scott R. Pajtas

It is certified that error appears in the above-identified patent and that said Letters Patent is hereby corrected as shown below:

Column 14, Claim 13, Line 21, "said and said" should read --said tread and said--.

Column 14, Claim 17, Line 35 ",3" should read --3,--.

Column 14, Claim 17, Line 47 "20°" should read --20%--.

Signed and Sealed this

Twenty-first Day of April, 1992

Attest:

HARRY F. MANBECK, JR.

*Attesting Officer*   *Commissioner of Patents and Trademarks*